United States Patent
Kimura et al.

(10) Patent No.: US 9,352,644 B2
(45) Date of Patent: May 31, 2016

(54) VEHICLE

(75) Inventors: Kenji Kimura, Miyoshi (JP); Akihiro Sato, Nagoya (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 13/880,791

(22) PCT Filed: Aug. 30, 2011

(86) PCT No.: PCT/JP2011/004832
§ 371 (c)(1),
(2), (4) Date: Apr. 22, 2013

(87) PCT Pub. No.: WO2013/030881
PCT Pub. Date: Mar. 7, 2013

(65) Prior Publication Data
US 2014/0166379 A1 Jun. 19, 2014

(51) Int. Cl.
*B60K 1/04* (2006.01)
*B60K 6/20* (2007.10)
(Continued)

(52) U.S. Cl.
CPC .............. *B60K 6/20* (2013.01); *B60H 1/00278* (2013.01); *B60K 1/04* (2013.01); *H01M 2/1083* (2013.01);
(Continued)

(58) Field of Classification Search
CPC .............. B60K 6/40; B60K 6/28; B60K 6/20; B60K 1/04; B60K 2001/0416; B60K 2001/0422; Y02T 10/3213; Y02T 10/6278; H01M 2/1083; H01M 10/5016; B60H 1/00278; B60H 2001/003; Y10S 903/951
USPC .............. 180/65.21, 65.22, 65.29, 68.1, 68.5, 180/89.11; 903/903, 951
See application file for complete search history.

(56) References Cited

U.S. PATENT DOCUMENTS

| | | | | |
|---|---|---|---|---|
| 4,025,860 A | * | 5/1977 | Shibata et al. | 320/126 |
| 4,066,936 A | * | 1/1978 | Hirota | 318/139 |

(Continued)

FOREIGN PATENT DOCUMENTS

| | | |
|---|---|---|
| CA | 2428403 A1 * | 11/2004 |
| JP | 10-285800 | 10/1998 |

(Continued)

OTHER PUBLICATIONS

Ahmad A. Pesaran, "Battery Thermal Management in EVs and HEVs: Issues and Solutions", Advanced Automotive Battery Conference, Feb. 6-8, 2001.*

(Continued)

*Primary Examiner* — Paul N Dickson
*Assistant Examiner* — Steve Clemmons
(74) *Attorney, Agent, or Firm* — Finnegan, Henderson, Farabow, Garrett & Dunner, LLP

(57) ABSTRACT

A vehicle has a motor and an engine each serving as a driving source for running the vehicle, and assembled batteries each capable of supplying an electric power to the motor. The assembled batteries include a high-power assembled battery and a high-capacity assembled battery. The high-power assembled battery is capable of charge and discharge with a current relatively larger than that in the high-capacity assembled battery, and the high-capacity assembled battery has an energy capacity relatively larger than that of the high-power assembled battery. In running of the vehicle using an output from the motor with the engine stopped, the high-capacity assembled battery supplies a more electric power to the motor than that in the high-power assembled battery. The high-power assembled battery is placed in a riding space where a passenger rides, and the high-capacity assembled battery is placed in a luggage space different from the riding space.

8 Claims, 7 Drawing Sheets

(51) Int. Cl.
*H01M 2/10* (2006.01)
*B60H 1/00* (2006.01)

(52) U.S. Cl.
CPC ... *B60H 2001/003* (2013.01); *B60K 2001/0416* (2013.01); *B60K 2001/0422* (2013.01); *Y02T 10/6278* (2013.01); *Y10S 903/951* (2013.01)

(56) References Cited

U.S. PATENT DOCUMENTS

| | | | | |
|---|---|---|---|---|
| 4,334,819 | A * | 6/1982 | Hammerslag | 414/395 |
| 6,264,260 | B1 * | 7/2001 | Kronner et al. | 296/37.15 |
| 6,281,646 | B1 * | 8/2001 | Masberg et al. | 318/139 |
| 6,331,365 | B1 * | 12/2001 | King | B60L 11/1803 320/103 |
| 6,737,822 | B2 * | 5/2004 | King | 318/375 |
| 6,811,197 | B1 * | 11/2004 | Grabowski et al. | 296/37.8 |
| 7,023,683 | B1 * | 4/2006 | Guo et al. | 361/166 |
| 7,049,792 | B2 * | 5/2006 | King | 320/126 |
| 7,399,554 | B2 * | 7/2008 | Kejha | H01M 10/441 320/103 |
| 7,486,034 | B2 * | 2/2009 | Nakamura et al. | 318/139 |
| 7,570,012 | B2 * | 8/2009 | Dasgupta | B60L 11/1809 320/104 |
| 7,654,351 | B2 * | 2/2010 | Koike et al. | 180/68.5 |
| 8,543,271 | B2 * | 9/2013 | Yamamoto et al. | 701/22 |
| 8,617,745 | B2 * | 12/2013 | Gozdz | H01M 4/133 429/231.5 |
| 9,067,502 | B2 * | 6/2015 | Nakayama | H01M 2/1083 |
| 2002/0145404 | A1 * | 10/2002 | Dasgupta | H02J 7/0013 320/116 |
| 2003/0209375 | A1 * | 11/2003 | Suzuki et al. | 180/65.3 |
| 2004/0016580 | A1 * | 1/2004 | Kronner et al. | 180/68.5 |
| 2004/0226765 | A1 * | 11/2004 | Mathews et al. | 180/68.5 |
| 2005/0151509 | A1 * | 7/2005 | Cook | 320/116 |
| 2006/0250902 | A1 * | 11/2006 | Bender et al. | 369/1 |
| 2007/0068714 | A1 * | 3/2007 | Bender | B60K 6/28 180/65.29 |
| 2008/0063932 | A1 * | 3/2008 | Ishizu et al. | 429/129 |
| 2008/0164081 | A1 * | 7/2008 | Watanabe et al. | 180/65.2 |
| 2008/0197810 | A1 * | 8/2008 | Ishikawa et al. | 320/135 |
| 2008/0215200 | A1 * | 9/2008 | Toth | 701/22 |
| 2008/0245587 | A1 * | 10/2008 | Sastry et al. | 180/65.2 |
| 2008/0274397 | A1 * | 11/2008 | Watanabe | 429/99 |
| 2009/0315359 | A1 * | 12/2009 | Suzuki et al. | 296/64 |
| 2010/0001553 | A1 * | 1/2010 | Yoda | 296/193.07 |
| 2010/0075206 | A1 * | 3/2010 | Tamura | 429/62 |
| 2010/0087961 | A1 * | 4/2010 | Velez | 700/292 |
| 2010/0089675 | A1 * | 4/2010 | Nagata et al. | 180/68.5 |
| 2011/0011654 | A1 * | 1/2011 | Kubota et al. | 180/65.21 |
| 2011/0250494 | A1 * | 10/2011 | Nomura et al. | 429/188 |
| 2012/0028105 | A1 * | 2/2012 | Kumar | H01M 4/131 429/149 |

FOREIGN PATENT DOCUMENTS

| | | | |
|---|---|---|---|
| JP | 2006-79987 | 3/2006 | |
| JP | 2008-91188 | 4/2008 | |
| JP | 4288333 B1 * | 7/2009 | |
| JP | 2009-240094 | 10/2009 | |
| WO | WO 2008121982 A1 * | 10/2008 | B60K 6/28 |

OTHER PUBLICATIONS

Oswal et al., A comparative study of Lithium-Ion Batteries, 2007, University of Southern California.*

CellTech Energy Systems: ithium Iron Phosphate LiFePO4 batteries, dated Jan. 30, 2008.*

Omar et al: Peukert Revisited—Critical Appraisal and Need for Modification for Lithium-Ion batteries, energies 2013, 6, 5625-5641, Oct. 25, 2013.*

* cited by examiner

VEHICLE

CROSS-REFERENCE TO RELATED APPLICATIONS

This application is a national phase application of International Application No. PCT/JP2011/004832, filed Aug. 30, 2011, the content of which is incorporated herein by reference.

TECHNICAL FIELD

The present invention relates to a vehicle including a plurality of assembled batteries having different characteristics.

BACKGROUND ART

A battery system described in Patent Document 1 includes a high-capacity battery and a high-power battery which are connected in parallel to a load. The high-capacity battery has an energy capacity larger than that of the high-power battery. The high-power battery allows charge and discharge with a current larger than that in the high-capacity battery.

PRIOR ART DOCUMENT

Patent Document

[Patent Document 1] Japanese Patent Laid-Open No. 2006-079987

SUMMARY OF THE INVENTION

Problems to be Solved by the Invention

Patent Document 1 has disclosed a vehicle including the high-capacity battery and the high-power battery but has not made any disclosure of an arrangement of the high-capacity battery and the high-power battery. The high-capacity battery and the high-power battery may have different characteristics or may be used in different manners. If the high-capacity battery and the high-power battery are mounted on the vehicle without consideration of the characteristics and the like of the high-capacity battery and the high-power battery, the vehicle experiences reduced salability such as smaller interior space and worse NV.

Means for Solving the Problems

A vehicle according to the present invention has a motor and an engine each serving as a driving source for running the vehicle, and assembled batteries each capable of supplying an electric power to the motor. The assembled batteries include a high-power assembled battery and a high-capacity assembled battery constituted by secondary batteries, respectively. The high-power assembled battery is capable of charge and discharge with a current relatively larger than that in the high-capacity assembled battery, and the high-capacity assembled battery has an energy capacity relatively larger than that of the high-power assembled battery. In running of the vehicle using an output from the motor with the engine stopped, the high-capacity assembled battery supplies a more electric power to the motor than that in the high-power assembled battery. The high-power assembled battery is placed in a riding space where a passenger rides, and the high-capacity assembled battery is placed in a luggage space different from the riding space.

In running of the vehicle using the output from the motor with the engine stopped, the operating sound of the assembled battery is heard by the passenger more easily than while the engine is driven. In running of the vehicle using the output from the motor with the engine stopped, the high-capacity assembled battery supplies the more electric power to the motor than that in the high-power assembled battery, so that the operating sound of the high-capacity assembled battery is relatively louder than that of the high-power assembled battery. Since the high-capacity assembled battery is placed in the luggage space, the operating sound of the high-capacity assembled battery can hardly reach the riding space. The placement of the high-power assembled battery in the riding space can easily ensure the space for placing luggage in the luggage space to improve the salability of the vehicle.

The high-power assembled battery can achieve charge and discharge with the current larger than that of the high-capacity assembled battery and thus tends to produce more heat. Since the amount of heat production is proportional to the square of the value of the current, the high-power assembled battery having the value of the current higher than that of the high-capacity assembled battery tends to produce more heat. Since a passenger rides in the riding space in which the high-power assembled battery is placed, the temperature of the riding space is often adjusted to a temperature suitable for the passenger and the battery. Since the high-power assembled battery is placed in the riding space, air in the riding space can be directed to the high-power assembled battery to suppress a rise in temperature of the high-power assembled battery resulting from the heat production and the like.

In running of the vehicle using the output from the motor with the engine stopped, the frequency of use of the high-capacity assembled battery is higher than the frequency of use of the high-power assembled battery. In running of the vehicle using the output from the motor with the engine stopped, the proportion of the electric power supplied from the high-capacity assembled battery to the motor in the electric power supplied to the motor is higher than the proportion of the electric power supplied from the high-power assembled battery to the motor. The preferential use of the high-capacity assembled battery can ensure the running distance of the vehicle.

The vehicle can include an air-conditioner used in adjusting the temperature of the riding space. The air-conditioner has a blow-off port for blowing air used in temperature adjustment. The high-power assembled battery can be placed closer to the blow-off port than the high-capacity assembled battery. The placement of the high-power assembled battery closer to the blow-off port facilitates introduction of the air from the blow-off port to the high-power assembled battery. As described above, the high-power assembled battery produces more heat than the high-capacity assembled battery. Thus, the air from the blow-off port can be readily introduced to the high-power assembled battery to suppress a rise in temperature of the high-power assembled battery caused by heat production.

The high-capacity assembled battery is replaced at a frequency higher than that of the high-power assembled battery. Since the high-capacity assembled battery has a higher temperature dependence than that of the high-power assembled battery, the high-capacity assembled battery may be deteriorated more than the high-power assembled battery in response to a temperature change. Once the high-capacity assembled battery is deteriorated, the high-capacity assembled battery needs replacement. The high-capacity assembled battery is used to ensure the running distance of the vehicle as described above, and the capacity of the high-capacity assembled battery can be changed to respond to the need of a user. In this case, the high-capacity assembled battery also needs replacement.

Since the high-capacity assembled battery is placed in the luggage space wider than the riding space, the high-capacity assembled battery can be replaced readily. Since seats and the like are placed in the riding space, the space for placing the assembled battery is limited. In contrast, the luggage space is a previously reserved space for placing luggage or the like and is wider than the riding space.

The size of the high-capacity assembled battery tends to be larger than the size of the high-power assembled battery in order to ensure the running distance of the vehicle described above. The space for placing the high-capacity assembled battery can be provided easily by using the luggage space. In changing the capacity, that is, the size of the high-capacity assembled battery, the use of the luggage space facilitates the size change of the high-capacity assembled battery.

The high-power assembled battery can include a plurality of cells connected in series. The high-capacity assembled battery can include a plurality of cells connected in parallel. A square-type cell can be used as the cell of the high-power assembled battery, and a cylinder-type cell can be used as the cell of the high-capacity assembled battery.

MODE FOR CARRYING OUT THE INVENTION

An embodiment of the present invention will hereinafter be described.

Embodiment 1

Figure 1:
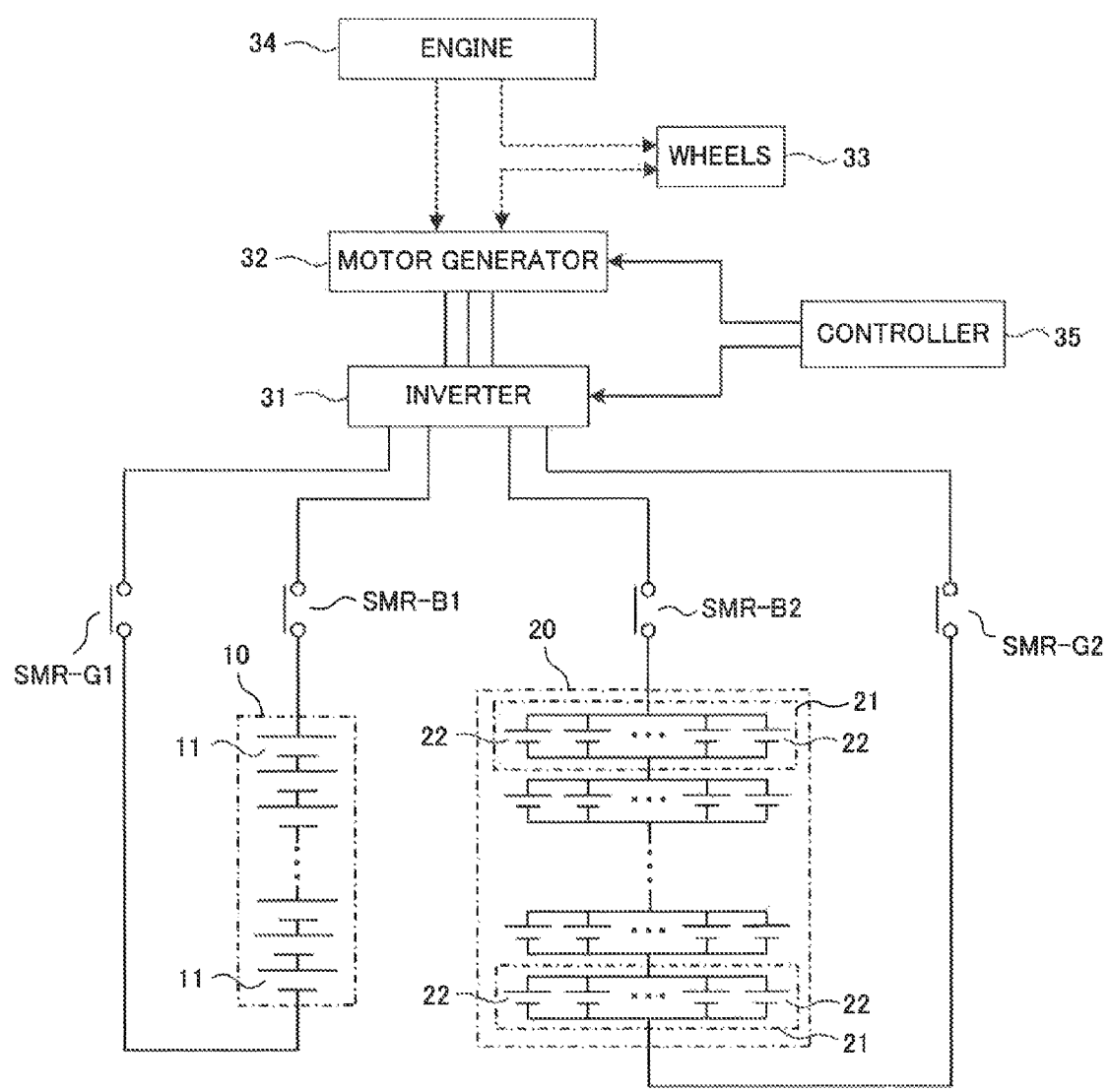
FIG. 1 is a diagram showing the configuration of a battery system.

A battery system according to the present embodiment is described with reference to FIG. 1. FIG. 1 is a schematic diagram showing the configuration of the battery system. The battery system according to the present embodiment is mounted on a vehicle. In FIG. 1, connections indicated by solid lines represent electrical connections, and connections indicated by dotted lines represent mechanical connections.

The battery system has a high-power assembled battery 10 and a high-capacity assembled battery 20 which are connected in parallel to each other. The high-power assembled battery 10 is connected to an inverter 31 through system main relays SMR-B1 and SMR-G1. The high-capacity assembled battery 20 is connected to the inverter 31 through system main relays SMR-B2 and SMR-G2. The inverter 31 converts a DC power supplied from each of the assembled batteries 10 and 20 into an AC power.

A motor generator 32 (AC motor) is connected to the inverter 31 and receives the AC power supplied from the inverter 31 to generate a kinetic energy for running the vehicle. The motor generator 32 is connected to wheels 33. An engine 34 is connected to the wheels 33, and a kinetic energy generated by the engine 34 is transferred to the wheels 33.

For decelerating or stopping the vehicle, the motor generator 32 converts a kinetic energy produced in braking the vehicle into an electric energy (AC power). The inverter 31 converts the AC power generated by the motor generator 32 into a DC power and supplies the DC power to the assembled batteries 10 and 20. This allows the assembled batteries 10 and 20 to store the regenerative electric power.

A controller 35 outputs a control signal to each of the inverter 31 and the motor generator 32 to control the driving thereof. The controller 35 also outputs a control signal to each of the system main relays SMR-B1 and B2, and SMR-G1 and G2 to make switching thereof between ON and OFF.

When the system main relays SMR-B1 and SMR-G1 are ON, charge and discharge of the high-power assembled battery 10 are allowed. When the system main relays SMR-B1 and SMR-G1 are OFF, the charge and discharge of the high-power assembled battery 10 are inhibited. When the system main relays SMR-B2 and SMR-G2 are ON, charge and discharge of the high-capacity assembled battery 20 are allowed. When the system main relays SMR-B2 and SMR-G2 are OFF, the charge and discharge of the high-capacity assembled battery 20 are inhibited.

While the assembled batteries 10 and 20 are connected to the inverter 31 in the present embodiment, the present invention is not limited thereto. Specifically, a step-up circuit may be placed on the current path between the assembled batteries 10 and 20 and the inverter 31. This arrangement enables the step-up circuit to increase the voltage output from each of the assembled batteries 10 and 20.

The vehicle according to the present embodiment includes not only the assembled batteries 10 and 20 but also the engine 34 as the power source for running the vehicle. The engine 34 includes one which employs gasoline, a diesel fuel, or a biofuel.

The vehicle according to the present embodiment can be run by using only the outputs from the high-power assembled battery 10 and the high-capacity assembled battery 20. This running mode is referred to as an EV (Electric Vehicle) running mode. For example, the vehicle can be run by discharging the high-capacity assembled battery 20 from near 100% to near 0% SOC (State of Charge). After the SOC of the high-capacity assembled battery 20 reaches near 0%, an external power source can be used to charge the high-capacity assembled battery 20. A commercial power source can be used as the external power source, for example. When the commercial power source is used, a charger is required to convert an AC power into a DC power.

When a driver of the vehicle presses an accelerator pedal to increase the output required of the vehicle in the EV running mode, not only the output from the high-capacity assembled battery 20 but also the output from the high-power assembled battery 10 can be used to run the vehicle. The combinational use of the high-capacity assembled battery 20 and the high-power assembled battery 10 can ensure the battery output in accordance with the pressing of the accelerator pedal to improve the drivability.

After the SOC of the high-capacity assembled battery 20 reaches near 0%, the high-power assembled battery 10 and the engine 34 can be used in combination to run the vehicle. This running mode is referred to as an HV (Hybrid Vehicle) running mode. In the HV running mode, the charge and discharge of the high-power assembled battery 10 can be controlled such that the SOC of the high-power assembled battery 10 is changed along a predefined reference SOC, for example.

When the SOC of the high-power assembled battery 10 is higher than the reference SOC, the high-power assembled battery 10 can be discharged to bring the SOC of the high-power assembled battery 10 closer to the reference SOC. Alternatively, when the SOC of the high-power assembled battery 10 is lower than the reference SOC, the high-power assembled battery 10 can be charged to bring the SOC of the high-power assembled battery 10 closer to the reference SOC. In the HV running mode, not only the high-power assembled battery 10 but also the high-capacity assembled battery 20 can be used. Specifically, the capacity of the high-capacity assembled battery 20 is reserved, and the high-capacity assembled battery 20 can be discharged in the HV running mode. In addition, the regenerative electric power may be stored in the high-capacity assembled battery 20.

As described above, the high-capacity assembled battery 20 can be used mainly in the EV running mode, and the high-power assembled battery 10 can be used mainly in the HV running mode. The main use of the high-capacity assembled battery 20 in the EV running mode means the following two cases. Firstly, it means that the frequency of use of the high-capacity assembled battery 20 is higher than that of the high-power assembled battery 10 in the EV running mode. Secondly, when the high-capacity assembled battery 20 and the high-power assembled battery 10 are used in combination in the EV running mode, the main use of the high-capacity assembled battery 20 means that the proportion of the electric power output from the high-capacity assembled battery 20 in the total electric power used in running of the vehicle is higher than the proportion of the electric power output from the high-power assembled battery 10. The total electric power refers to an electric power used in a predetermined running time or a running distance, rather than a momentary electric power.

Figure 2:
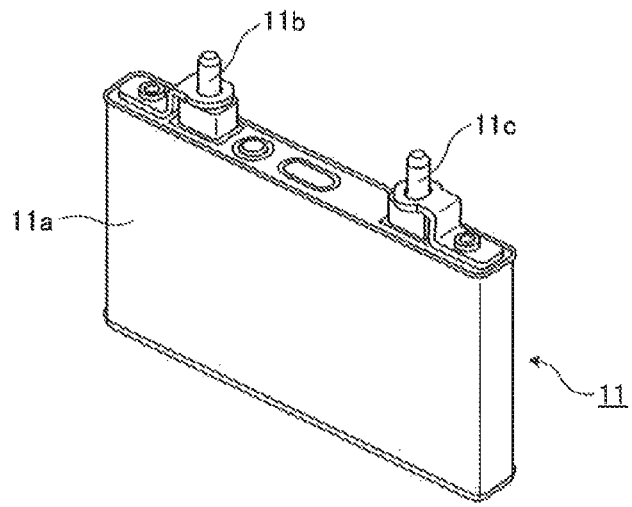
FIG. 2 is an external view of a cell used in a high-power assembled battery.

As shown in FIG. 1, the high-power assembled battery 10 has a plurality of cells 11 connected in series. A secondary battery such as a nickel metal hydride battery or a lithium-ion battery can be used as the cell 11. The number of the cells 11 constituting the high-power assembled battery 10 can be set as appropriate by taking account of the output required of the high-power assembled battery 10 and the like. As shown in FIG. 2, the cell 11 is a so-called square-type cell. The square-type cell refers to a cell having an outer shape conformed to a rectangle.

In FIG. 2, the cell 11 has a battery case 11a conformed to a rectangle. The battery case 11a accommodates a power-generating element performing charge and discharge. The power-generating element has a positive electrode component, a negative electrode component, and a separator placed between the positive electrode component and the negative electrode component. The separator contains an electrolytic solution. The positive electrode component has a collector plate and a positive electrode active material layer formed on a surface of the collector plate. The negative electrode component has a collector plate and a negative electrode active material layer formed on a surface of the collector plate.

A positive electrode terminal 11b and a negative electrode terminal 11c are placed on an upper face of the battery case 11a. The positive electrode terminal 11b is connected electrically to the positive electrode component of the power-generating element, and the negative electrode terminal 11c is connected electrically to the negative electrode component of the power-generating element.

Figure 3:
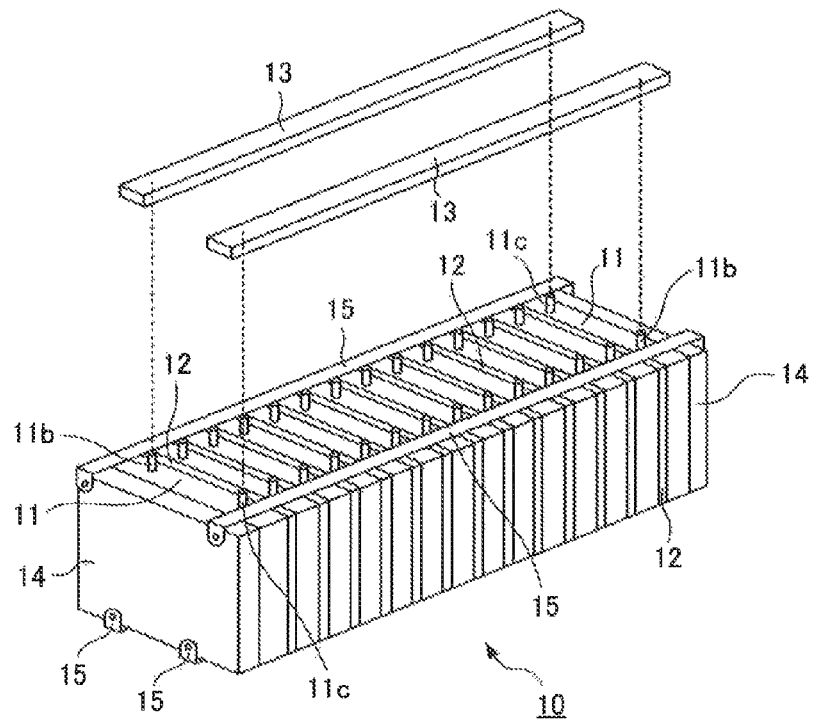
FIG. 3 is an external view of the high-power assembled battery.

As shown in FIG. 3, the high-power assembled battery 10 has the plurality of cells 11 placed side by side in one direction. A partitioning plate 12 is placed between adjacent two of the cells 11. The partitioning plate 12 can be made of an insulating material such as resin to ensure the insulating state between the two cells 11.

The use of the partitioning plate 12 can provide space on an outer face of the cell 11. Specifically, the partitioning plate 12 can have a protruding portion which protrudes toward the cell 11, and the leading end of the protruding portion can be brought into contact with the cell 11 to provide the space between the partitioning plate 12 and the cell 11. In this space, air used for adjusting the temperature of the cell 11 can be moved.

When the cell 11 generates heat due to charge and discharge or the like, air for cooling can be introduced into the space provided between the partitioning plate 12 and the cell 11. The air for cooling can exchange heat with the cell 11 to suppress a rise in temperature of the cell 11. Alternatively, when the cell 11 is excessively cooled, air for heating can be introduced into the space provided between the partitioning plate 12 and the cell 11. The air for heating can exchange heat with the cell 11 to suppress a drop in temperature of the cell 11.

The plurality of cells 11 are connected electrically in series through two bus bar modules 13. The bus bar module 13 has a plurality of bus bars and a holder for holding the plurality of bus bars. The bus bar is made of a conductive material and is connected to the positive electrode terminal 11b of one of two adjacent cells 11 and the negative electrode terminal 11c of the other cell 11. The holder is formed of an insulating material such as resin.

A pair of endplates 14 is placed at both ends of the high-power assembled battery 10 in the direction in which the plurality of cells 11 are arranged. Restraint bands 15 extending in the direction of the arrangement of the plurality of cells 11 are connected to the pair of end plates 14. This can apply a restraint force to the plurality of cells 11. The restraint force refers to a force with which each of the cells 11 is held tightly in the direction of the arrangement of the plurality of cells 11. The restraint force applied to the cells 11 can suppress expansion of the cell 11 or the like.

In the present embodiment, two restraint bands 15 are placed on an upper face of the high-power assembled battery 10 and two restraint bands 15 are placed on a lower face of the high-power assembled battery 10. The number of the restraint bands 15 can be set as appropriate. It is only required that the use of the restraint bands 15 and the end plates 14 can apply the restraint force to the cells 11. Alternatively, the restraint force may not be applied to the cells 11, and the end plates 14 and the restraint bands 15 may be omitted.

While the plurality of cells 11 are arranged in one direction in the present embodiment, the present invention is not limited thereto. For example, a plurality of cells may be used to constitute a single battery module, and a plurality of such battery modules may be arranged in one direction.

As shown in FIG. 1, the high-capacity assembled battery 20 has a plurality of battery blocks 21 connected in series. Each of the battery blocks 21 has a plurality of cells 22 connected in parallel. The number of the battery blocks 21 and the number of the cells 22 included in each of the battery blocks 21 can be set as appropriate in view of the output required of the high-capacity assembled battery 20, the capacity thereof or the like. While the plurality of cells 22 are connected in parallel in the battery block 21 of the present embodiment, the present invention is not limited thereto. Specifically, a plurality of battery modules each including a plurality of cells 22 connected in series may be provided and connected in parallel to constitute the battery block 21.

Figure 4:
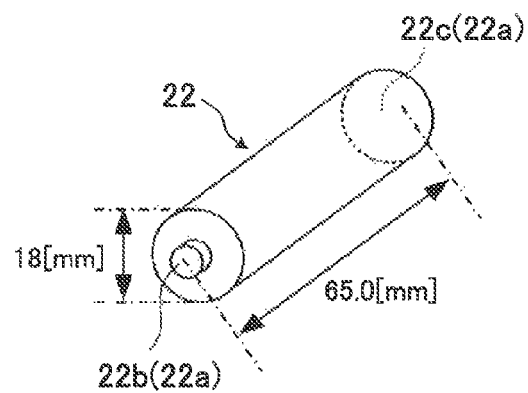
FIG. 4 is an external view of a cell used in a high-capacity assembled battery.

A secondary battery such as a nickel metal hydride battery or a lithium-ion battery can be used as the cell 22. As shown in FIG. 4, the cell 22 is a so-called cylinder-type cell. The cylinder-type cell refers to a cell having an outer shape conformed to a cylinder.

As shown in FIG. 4, the cylinder-type cell 22 has a cylindrical battery case 22a. The battery case 22a accommodates a power-generating element. The power-generating element in the cell 22 has constituent members similar to the constituent members of the power-generating element in the cell 11.

A positive electrode terminal 22b and a negative electrode terminal 22c are provided at both ends of the cell 22 in a longitudinal direction. The positive electrode terminal 22b and the negative electrode terminal 22c form the battery case 22a. The positive electrode terminal 22b is connected electrically to a positive electrode component of the power-generating element, and the negative electrode terminal 22c is connected electrically to a negative electrode component of the power-generating element. The cell 22 of the present embodiment is a battery called 18650 type having a diameter of 18 mm and a length of 65.0 mm. The cell 22 may be a cell having dimensions different from those of the 18650 type.

Figure 5:
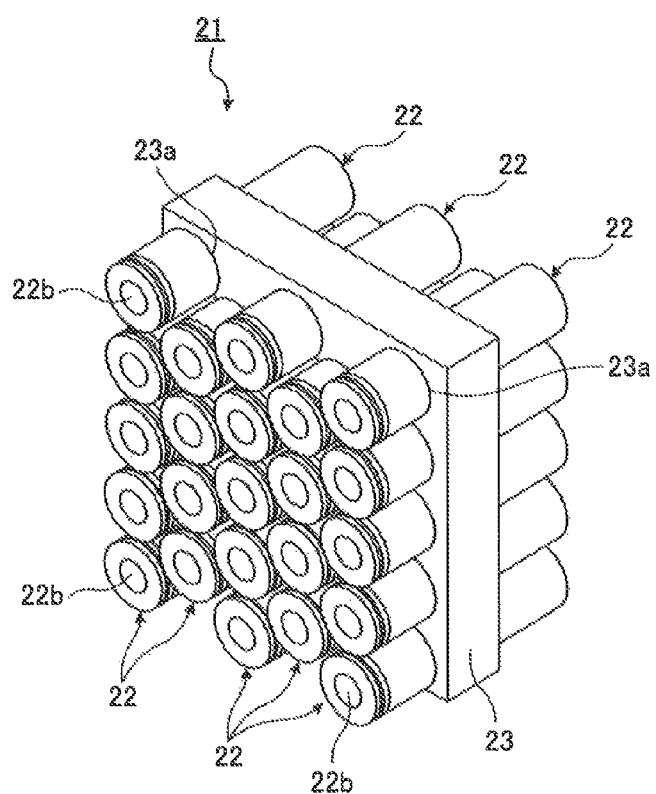
FIG. 5 is an external view of a battery block used in the high-capacity assembled battery.

As shown in FIG. 5, the battery block 21 has the plurality of cells 22 and a holder 23 which holds the plurality of cells 22. The plurality of battery blocks 21 are arranged to constitute the high-capacity assembled battery 20. The plurality of battery blocks 21 are connected in series through an electrical cable or the like. The high-capacity assembled battery 20 is used to ensure the running distance in the EV running mode, and the many cells 22 are used. Thus, the size of the high-capacity assembled battery 20 tends to be larger than the size of the high-power assembled battery 10.

The holder 23 has through holes 23a into which the cells 22 are inserted. The number of the through holes 23a is equal to the number of the cells 22. The plurality of cells 22 are placed such that the positive electrode terminals 22b (or the negative electrode terminals 22c) are located on the same side of the holder 23. The plurality of positive electrode terminals 22b are connected to a single bus bar, and the plurality of negative electrode terminals 22c are connected to a single bus bar. This achieves the electrical parallel connection of the plurality of cells 22.

While the single holder 23 is used in the battery block 21 of the present embodiment, a plurality of holders 23 may be used. For example, one of the holders 23 can be used to hold the cells 22 on the side of the positive electrode terminals 22b, and the other holder 23 can be used to hold the cells 22 on the side of the negative electrode terminals 22c.

Next, description is made of the characteristics of the cell 11 used in the high-power assembled battery 10 and the characteristics of the cell 22 used in the high-capacity assembled battery 20. Table 1 shows the comparison between the characteristics of the cells 11 and 22. In Table 1, "high" and "low" represent the relative levels when the two cells 11 and 22 are compared. Specifically, "high" represents a higher level than that of the compared cell, and "low" represents a lower level than that of the compared cell.

TABLE 1

| | cell 11 (high-power type) | cell 22 (high-capacity type) |
|---|---|---|
| output density | high | low |
| power capacity density | low | high |
| dependence of input/output on temperature | low | high |
| dependence of battery life on temperature | low | high |

The cell 11 has an output density higher than that of the cell 22. The output density of each of the cells 11 and 22 can be represented as an electric power per unit mass of the cell (in W/kg) or an electric power per unit volume of the cell (in W/L). When the cells 11 and 22 have equal masses or volumes, the output (W) of the cell 11 is higher than the output (W) of the cell 22.

The output density in the electrode component (positive electrode component or negative electrode component) of each of the cells 11 and 22 can be represented as a current value per unit area of the electrode component (in $mA/cm^2$). The output density of the electrode component of the cell 11 is higher than that of the cell 22. When the electrode components have equal areas, the value of a current capable of passing through the electrode component of the cell 11 is higher than the value of a current capable of passing through the electrode component of the cell 22.

The cell 22 has a power capacity density higher than that of the cell 11. The power capacity density of each of the cells 11 and 22 can be represented as a capacity per unit mass of the cell (in Wh/kg) or a capacity per unit volume of the cell (in Wh/L). When the cells 11 and 22 have equal masses or volumes, the power capacity (Wh) of the cell 22 is higher than the power capacity (Wh) of the cell 11.

The capacity density in the electrode component of each of the cells 11 and 22 can be represented as a capacity per unit mass of the electrode component (in mAh/g) or a capacity per unit volume of the electrode component (in mAh/cc), for example. The capacity density of the electrode component of the cell 22 is higher than that of the cell 11. When the electrode components have equal masses or volumes, the capacity of the electrode component of the cell 22 is higher than the capacity of the electrode component of the cell 11.

Figure 6:
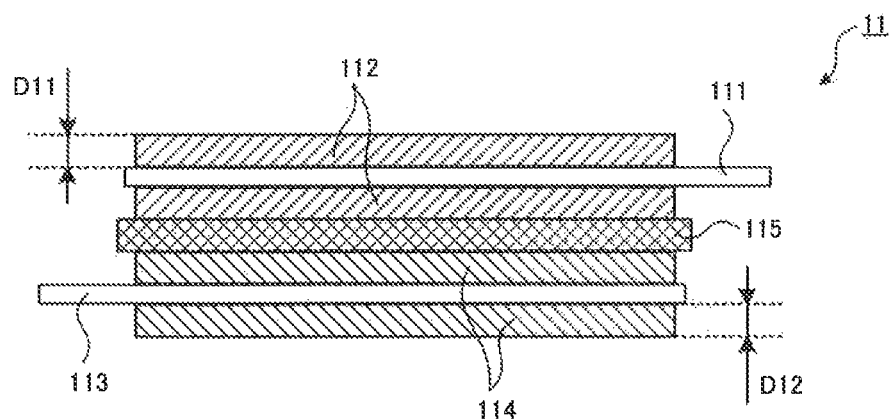
FIG. 6 is a diagram showing the configuration of a power-generating element used in the cell of the high-power assembled battery.
Figure 7:
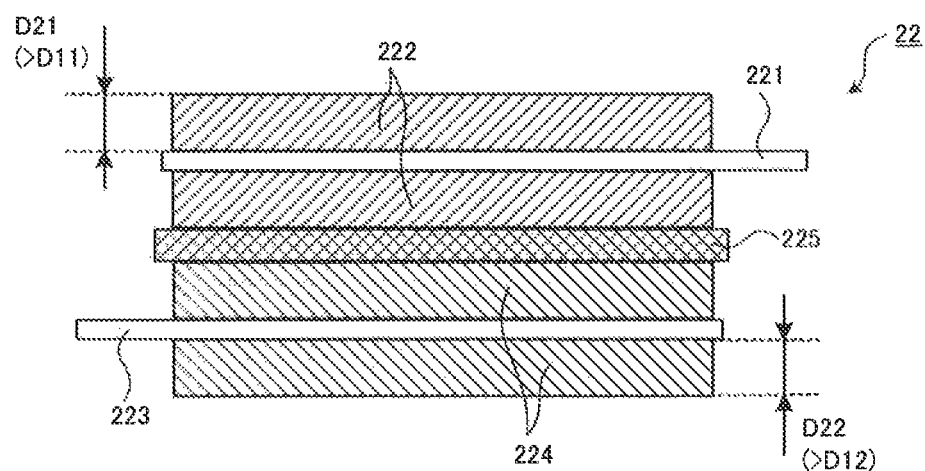
FIG. 7 is a diagram showing the configuration of a power-generating element used in a cell of the high-capacity assembled battery.

FIG. 6 is a schematic diagram showing the configuration of the power-generating element in the cell 11. FIG. 7 is a schematic diagram showing the configuration of the power-generating element in the cell 22.

In FIG. 6, the positive electrode component forming part of the power-generating element of the cell 11 has a collector plate 111 and an active material layer 112 formed on each face of the collector plate 111. When the cell 11 is a lithium-ion secondary battery, aluminum can be used as the material of the collector plate 111, for example. The active material layer 112 includes a positive electrode active material, a conductive material, a binder and the like.

The negative electrode component forming part of the power-generating element of the cell 11 has a collector plate 113 and an active material layer 114 formed on each face of the collector plate 113. When the cell 11 is a lithium-ion secondary battery, copper can be used as the material of the collector plate 113, for example. The active material layer 114 includes a negative electrode active material, a conductive material, a binder and the like.

A separator 115 is placed between the positive electrode component and the negative electrode component. The separator 115 is in contact with the active material layer 112 of the positive electrode component and the active material layer 114 of the negative electrode component. The positive electrode component, the separator 115, and the negative electrode component are layered in this order to constitute a laminate, and the laminate is wound, thereby making it possible to form the power-generating element.

While the active material layer 112 is formed on each face of the collector plate 111 and the active material layer 114 is formed on each face of the collector plate 113 in the present embodiment, the present invention is not limited thereto. Specifically, a so-called bipolar electrode can be used. The bipolar electrode has a positive electrode active material layer 112 formed on one face of a collector plate and a negative electrode active material layer 114 formed on the other face of the collector plate. A plurality of such bipolar electrodes are stacked with separators interposed, so that the power-generating element can be formed.

In FIG. 7, the positive electrode component forming part of the power-generating element of the cell 22 has a collector plate 221 and an active material layer 222 formed on each face of the collector plate 221. When the cell 22 is a lithium-ion secondary battery, aluminum can be used as the material of the collector plate 221, for example. The active material layer 222 includes a positive electrode active material, a conductive material, a binder and the like.

The negative electrode component forming part of the power-generating element of the cell 22 has a collector plate 223 and an active material layer 224 formed on each face of the collector plate 223. When the cell 22 is a lithium-ion secondary battery, copper can be used as the material of the collector plate 223, for example. The active material layer 224 includes a negative electrode active material, a conductive material, a binder and the like. A separator 225 is placed between the positive electrode component and the negative electrode component. The separator 225 is in contact with the active material layer 222 of the positive electrode component and the active material layer 224 of the negative electrode component.

As shown in FIG. 6 and FIG. 7, a thickness D11 of the active material layer 112 is smaller than a thickness D21 of the active material layer 222 when the positive electrode components of the cell 11 and the cell 22 are compared. When the negative electrode components of the cell 11 and the cell 22 are compared, a thickness D12 of the active material layer 114 is smaller than a thickness D22 of the active material layer 224. The thicknesses D11 and D12 of the active material layers 112 and 114 are smaller than the thicknesses D21 and D22 of the active material layers 222 and 224 can easily pass a current between the positive electrode component and the negative electrode component in the cell 11. Thus, the output density of the cell 11 is higher than the output density of the cell 22.

The volume per unit capacity (in cc/mAh) in the active material layer 112 is larger than that of the active material layer 222, and the volume per unit capacity in the active material layer 114 is larger than that of the active material layer 224. Since the thicknesses D21 and D22 of the active material layers 222 and 224 are larger than the thicknesses D11 and D12 of the active material layers 112 and 114, the capacity density of the cell 22 is higher than the capacity density of the cell 11.

Figure 8:
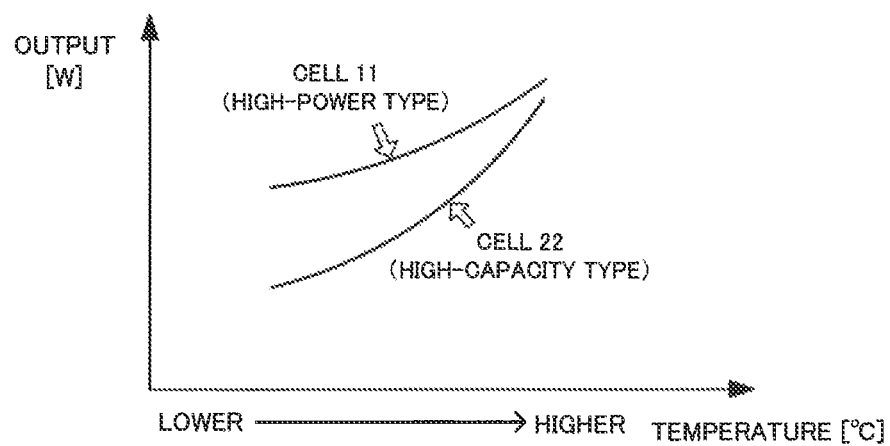
FIG. 8 is a graph showing the relationship between the output of the cell and temperature.

Next, description is made of the dependence of input/output of the battery on temperature. As shown in Table 1, the cell 22 has a higher dependence of input and output on temperature than that of the cell 11. Specifically, the input and output of the cell 22 are changed more easily than the input and output of the cell 11 in response to a temperature change. FIG. 8 shows the output characteristics of the cells 11 and 22 with respect to temperature. In FIG. 8, the horizontal axis represents the temperature and the vertical axis represents the output. While FIG. 8 shows the output characteristics of the cells 11 and 22, the input characteristics of the cells 11 and 22 have relationships similar to those shown in FIG. 8.

As shown in FIG. 8, the output performance of each of the cell (high-power type) 11 and the cell (high-capacity type) 22 is reduced as the temperature drops. The reduction rate of the output performance in the cell 11 is lower than the reduction rate of the output performance in the cell 22. In other words, the output performance of the cell 11 is less susceptible to the temperature than the output performance of the cell 22.

Figure 9:
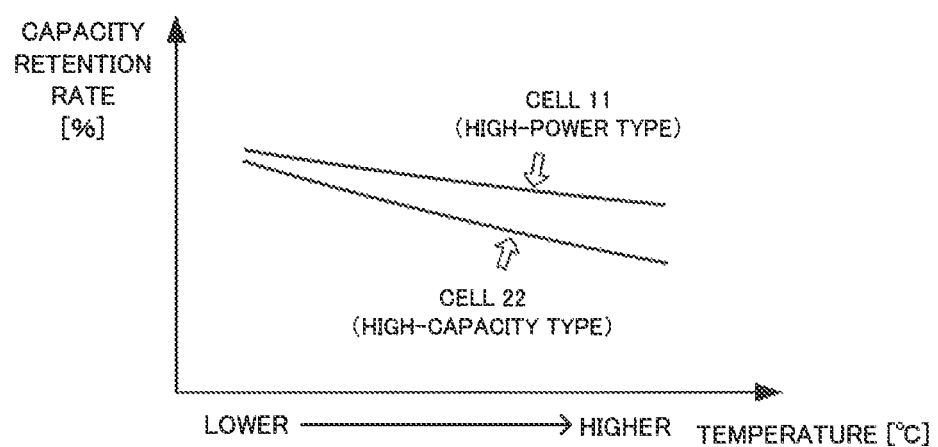
FIG. 9 is a graph showing the relationship between the capacity retention rate of the cell and temperature.

FIG. 9 is a graph showing the relationship between the capacity retention rate of each of the cells 11 and 22 and temperature. In FIG. 9, the horizontal axis represents the temperature and the vertical axis represents the capacity retention rate. The capacity retention rate is represented by the ratio between the capacity of each of the cells 11 and 22 in an initial state and the capacity of each of the cells 11 and 22 in a used state (deteriorated state) (deteriorated capacity/initial capacity). The initial state refers to the state immediately after each of the cells 11 and 22 is manufactured and before each of the cells 11 and 22 is used. The graph shown in FIG. 9 represents the capacity retention rates of the cells 11 and 22 after the cells are repeatedly charged and discharged at each temperature.

As shown in FIG. 9, the capacity retention rates of the cells 11 and 22 tend to be reduced as the temperature rises. The reductions in the capacity retention rate represent the deterioration of the cells 11 and 22. The reduction rate of the capacity retention rate of the cell 22 with respect to the temperature rise is higher than that of the cell 11. In other words, the cell 22 is deteriorated more readily than the cell 11 with respect to the temperature rise (temperature change). In this manner, the high-capacity assembled battery 20 has a higher dependence on temperature than that of the high-power assembled battery 10.

Figure 10:
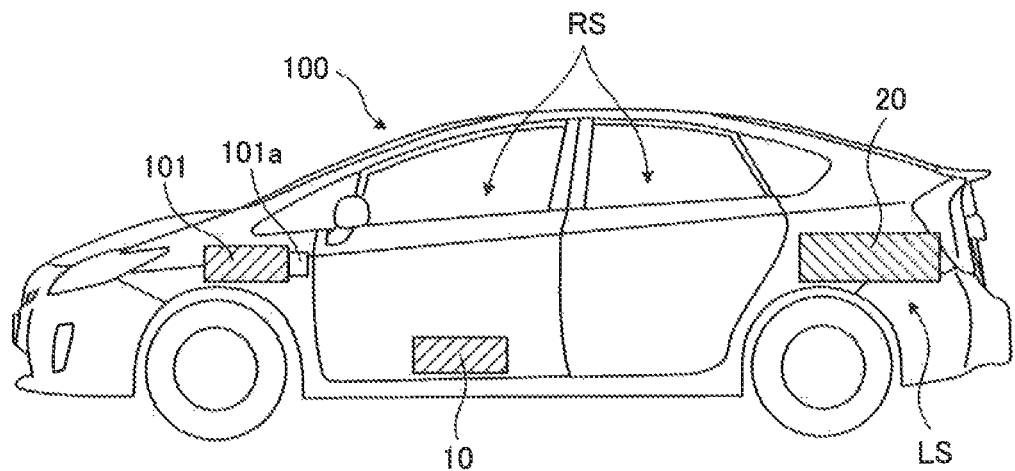
FIG. 10 is a schematic diagram of a vehicle on which the high-power assembled battery and the high-capacity assembled battery are mounted.

Next, description is made of the placement of the high-power assembled battery 10 and the high-capacity assembled battery 20 when they are mounted on the vehicle with reference to FIG. 10.

In the present embodiment, the high-power assembled battery 10 is placed in a riding space RS, and the high-capacity assembled battery 20 is placed in a luggage space LS of the vehicle 100. The riding space RS is space where passengers ride, and more particularly, space defined by seats (driver's seat, passenger's seat, and rear seats). The high-power assembled battery 10 can be placed, for example, in space formed between the driver's seat and the passenger's seat or space formed below a seat (seat cushion). When the high-power assembled battery 10 is placed between the driver's seat and the passenger's seat, the high-power assembled battery 10 can be housed in a console box.

An air-conditioner 101 is placed on a dashboard. The air-conditioner 101 is mainly used to adjust the temperature of the riding space RS and has a blow-off port 101*a* for directing air used for the temperature adjustment to the riding space RS. The blow-off port 101a is placed along the dashboard.

For example, when the temperature of the riding space RS rises, the air-conditioner 101 can be used to suppress the rise in temperature of the riding space RS or to reduce the temperature of the riding space RS. Alternatively, when the temperature of the riding space RS drops, the air-conditioner 101 can be used to suppress the drop in temperature of the riding space RS or to increase the temperature of the riding space RS.

The luggage space LS refers to space different from the riding space RS. In the present embodiment, the luggage space LS is located at the back of the riding space RS in the vehicle 100. The vehicle 100 may be a vehicle in which the riding space RS is separated from the luggage space LS by a partitioning member (part of a vehicle body) or a vehicle in which the riding space RS communicates with the luggage space LS. In a vehicle including a tonneau cover, the riding space RS can be separated from the luggage space LS by using the tonneau cover.

Figure 11:
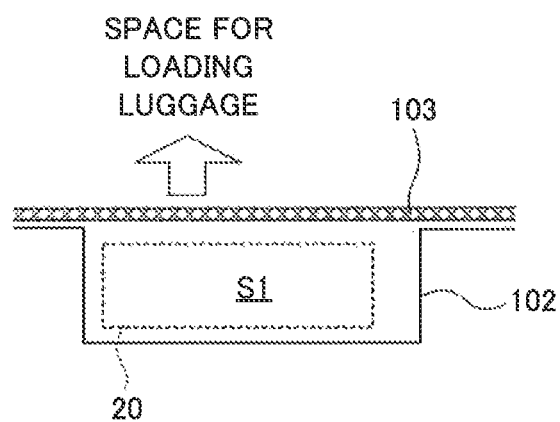
FIG. 11 is a schematic diagram showing an example of mounting of the high-capacity assembled battery.

The luggage space LS includes loading space in which luggage is put and space present around the loading space. The space present around the loading space includes, for example, space formed between the loading space and the vehicle body (specifically, a floor panel). The space formed between the loading space and the vehicle body is separated from the loading space by a deck board or the like. An example of the space is a space S1 used for accommodating a spare tire as shown in FIG. 11. The space S1 is formed by a floor panel 102 and is closed with a deck board 103. The high-capacity assembled battery 20 can be placed in the space S1.

The high-capacity assembled battery 20 can be placed in the space present around the loading space. The high-capacity assembled battery 20 and the loading space are separated from each other by a partitioning member such as a board. When the high-capacity assembled battery 20 is viewed from the loading space, the high-capacity assembled battery 20 is covered with the partitioning member.

Figure 12:
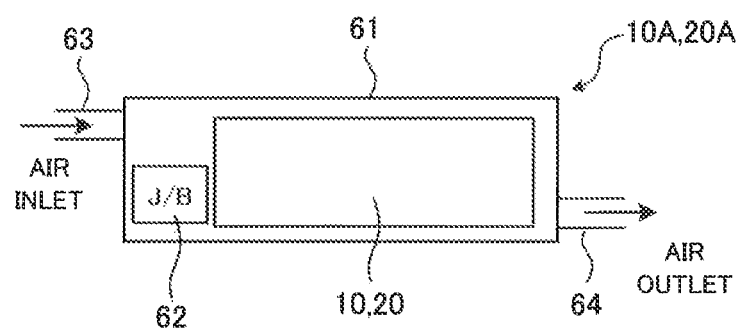
FIG. 12 is a schematic diagram showing the configuration of a battery pack.

In mounting the high-power assembled battery 10 and the high-capacity assembled battery 20 on the vehicle 100, the batteries 10 and 20 are mounted as battery packs 10A and 20A, respectively, on the vehicle 100 as shown in FIG. 12. The battery packs 10A and 20A each have a pack case 61 which accommodates the assembled batteries 10 and 20 and a junction box 62. The junction box 62 is placed at a position adjacent to the assembled batteries 10 and 20. The junction box 62 accommodates the system main relays SMR-B1 and B2, SMR-G1 and G2 (see FIG. 1) and the like.

An air inlet duct 63 and an air outlet duct 64 can be connected to each of the battery packs 10A and 20A. When a blower is placed for at least one of the air inlet duct 63 and the air outlet duct 64, the blower can be driven to supply the air for temperature adjustment to the assembled batteries 10 and 20. When the temperature of the assembled battery 10 or 20 rises, the air for cooling (cooled air) can be supplied to the assembled battery 10 or 20 to suppress the rise in temperature of the assembled battery 10 or 20. When the assembled battery 10 or 20 is excessively cooled, the air for heating (heated air) can be supplied to the assembled battery 10 or 20 to suppress the drop in temperature of the assembled battery 10 or 20.

The placement of the high-power assembled battery 10 in the riding space RS and the placement of the high-capacity assembled battery 20 in the luggage space LS as in the present embodiment can provide the following advantages.

When the vehicle 100 is run in the EV running mode, the frequency of use of the high-capacity assembled battery 20 is higher than that of the high-power assembled battery 10. In using the assembled batteries 10 and 20, it is necessary to operate the system main relays SMR-B1 and B2, and SMR-G1 and G2 provided for the assembled batteries 10 and 20, respectively. In the system main relay, a current is passed through a coil to produce a magnetic force which is then used to turn the switch from OFF to ON. Thus, a sound noise may occur in turning the system main relay from OFF to ON.

The high-capacity assembled battery 20 is placed in the luggage space LS different from the riding space RS where the high-power assembled battery 10 is placed. Even when the sound noise occurs in turning the system main relays SMR-B2 and G2 of the high-capacity assembled battery 20 from OFF to ON, the sound noise can hardly reach the passenger in the riding space RS.

When a charge or discharge current passes through the high-capacity assembled battery 20 or the high-power assembled battery 10, electric noise may occur, and the electric noise may cause a sound noise. Since the high-capacity assembled battery 20 is placed in the luggage space LS as described above, the sound noise produced in the high-capacity assembled battery 20 can hardly reach the passenger in the riding space RS.

Since the high-capacity assembled battery 20 is placed in the position (luggage space LS) at a distance from the riding space RS, the noise associated with the temperature adjustment of the battery can be prevented from reaching the passenger. The noise associated with the temperature adjustment include, for example, noise produced when the blower is driven, and noise produced from a flow of air supplied to the assembled battery 20.

As described above, the high-capacity assembled battery 20 can be used mainly in the EV running mode. The engine 34 is not operated and silence is required in the EV running mode. Since the sound noise or the noise hardly reaches the passenger during the use of the high-capacity assembled battery 20 in the present embodiment, the silence can be ensured.

The air-conditioner 101 is placed in the vehicle 100, and the temperature of the riding space RS is often adjusted to a temperature suitable not only for the passenger but also for the high-power assembled battery 10. Since the high-power assembled battery 10 is placed in the riding space RS, the air in the riding space RS can be directed to the high-power assembled battery 10 to adjust the temperature of the high-power assembled battery 10.

As descried above, the output density of the cell 11 used in the high-power assembled battery 10 is higher than the output density of the cell 22 used in the high-capacity assembled battery 20. Thus, the value of a current passing through the cell 11 during the use of the high-power assembled battery 10 is higher than the value of a current passing through the cell 22. Since the amount of heat production is proportional to the square of the value of the current, the amount of heat production is significantly increased as the value of the current is increased. As a result, the high-power assembled battery 10 has the characteristic of producing more heat than the high-capacity assembled battery 20, and preferably, the high-power assembled battery 10 is cooled more preferentially than the high-capacity assembled battery 20.

Since the high-power assembled battery 10 is placed in the riding space RS in the present embodiment, the air in the riding space RS can be used to suppress a rise in temperature of the high-power assembled battery 10 efficiently. The temperature of the riding space RS is often adjusted to a temperature suitable for the temperature adjustment of the high-power assembled battery 10 through the use of the air-conditioner 101 or the like. While the use of the air-conditioner 101 easily adjusts the temperature of the riding space RS, the adjustment of the temperature of the riding space RS may be performed, for example by opening a window for ventilation, without using the air-conditioner 101. The supply of the air in the riding space RS to the high-power assembled battery 10 can facilitate the temperature adjustment of the high-power assembled battery 10.

The placement of the high-power assembled battery 10 in the riding space RS can easily direct the air in the riding space RS to the high-power assembled battery 10. If the high-power assembled battery 10 is placed in the space formed between the driver's seat and the passenger's seat or the space formed below the driver's seat or the passenger's seat, the air for cooling is easily directed to the high-power assembled battery 10.

When the number of the cells 22 constituting the high-capacity assembled battery 20 is increased, the running distance in the EV running mode can be ensured. However, the increase in the number of the cells 22 increases the size of the high-capacity assembled battery 20. In the riding space RS, the seats and the like are placed, and it may be difficult to provide the space for placing the high-capacity assembled battery 20. On the other hand, a somewhat wide space is readily provided in the luggage space LS, and the space for placing the high-capacity assembled battery 20 is easily provided. In changing the capacity (in other words, the size) of the high-capacity assembled battery 20 in response to the need of a user, the placement of the high-capacity assembled battery 20 in the luggage space LS can readily satisfy the need for the change in size of the high-capacity assembled battery 20 associated with the changed capacity.

When the EV running mode has a higher priority than the HV running mode in running the vehicle 100, the frequency of use of the high-capacity assembled battery 20 is higher than that of the high-power assembled battery 10. When the EV running mode has a higher priority than the HV running mode, for example, the vehicle 100 is run in the EV running mode immediately after the starting, and the EV running mode can be switched to the HV running mode when the running in the EV running mode cannot be performed. The higher frequency of use of the high-capacity assembled battery 20 than that of the high-power assembled battery 10 may readily cause deterioration of the high-capacity assembled battery 20 due to charge and discharge. In addition, since the high-capacity assembled battery 20 has the higher temperature dependence than the high-power assembled battery 10 as described with reference to FIG. 9, the high-capacity assembled battery 20 may be deteriorated more easily than the high-power assembled battery 10 in response to a temperature change.

Once the high-capacity assembled battery 20 is deteriorated, at least part of the high-capacity assembled battery 20 needs replacement. For changing the capacity of the high-capacity assembled battery 20 in order to change the running distance in the EV running mode, the high-capacity assembled battery 20 also needs replacement. For example, to increase the running distance in the EV running mode, the number of the cells 22 (battery blocks 21) constituting the high-capacity assembled battery 20 can be increased. In this manner, the high-capacity assembled battery 20 is replaced at a higher frequency than that of the high-power assembled battery 10.

The high-capacity assembled battery 20 is placed in the luggage space LS of the vehicle 100, and the luggage space LS is the wide space, so that the high-capacity assembled battery 20 can be replaced easily. For example, in the configuration in which the high-capacity assembled battery 20 is covered with the partitioning plate, the high-capacity assembled battery 20 can be exposed only by removing the partitioning plate. Then, the fastening of the high-capacity assembled battery 20 to the vehicle can be released to remove the high-capacity assembled battery 20 easily from the luggage space LS.

The invention claimed is:

1. A vehicle comprising:
   a motor and an engine each serving as a driving source for running the vehicle;
   a high-power assembled battery and a high-capacity assembled battery each capable of supplying an electric power to the motor and each comprising lithium-ion secondary batteries, respectively, the high-power assembled battery and the high-capacity assembled battery being connected in parallel;
   a plurality of relays connected to a positive electrode terminal and a negative electrode terminal of the high-power assembled battery, respectively; and
   a plurality of relays connected to a positive electrode terminal and a negative electrode terminal of the high-capacity assembled battery, respectively,
   the lithium-ion secondary battery of the high-power assembled battery having an output density higher than that of the lithium-ion secondary battery of the high-capacity assembled battery,
   the lithium-ion secondary battery of the high-capacity assembled battery having a power capacity density higher than that of the lithium-ion secondary battery of the high-power assembled battery,
   in running of the vehicle using an output from the motor with the engine stopped, the high-capacity assembled battery supplying more electric power to the motor than that in the high-power assembled battery,
   wherein the high-power assembled battery and the plurality of relays connected to the high-power assembled battery are placed in a riding space where a passenger rides,
   the high-capacity assembled battery and the plurality of relays connected to the high-capacity assembled battery are placed in a luggage space different from the riding space,
   the high-capacity assembled battery has a battery characteristic changing more largely than that of the high-power assembled battery in response to a temperature change,
   a positive electrode active material layer of the lithium-ion secondary battery of the high-power assembled battery has a thickness smaller than that of positive electrode active material layer of the lithium-ion secondary battery of the high-capacity assembled battery, and
   a negative electrode active material layer of the lithium-ion secondary battery of the high-power assembled battery has a thickness smaller than that of a negative electrode active material layer of the lithium-ion second battery of the high-capacity assembled battery.

2. The vehicle according to claim 1, wherein, in running of the vehicle using the output from the motor with the engine stopped, a frequency of use of the high-capacity assembled battery is higher than a frequency of use of the high-power assembled battery.

3. The vehicle according to claim 1, wherein, in running of the vehicle using the output from the motor with the engine stopped, a proportion of the electric power supplied from the high-capacity assembled battery to the motor in the electric power supplied to the motor is higher than a proportion of the electric power supplied from the high-power assembled battery to the motor.

4. The vehicle according to claim 1, further comprising an air-conditioner used in adjusting a temperature of the riding space and including a blow-off port for air,
   wherein the high-power assembled battery is placed closer to the blow-off port than the high-capacity assembled battery.

5. The vehicle according to claim 1, wherein the high-capacity assembled battery is replaced at a frequency higher than that of the high-power assembled battery.

6. The vehicle according to claim 1, wherein the high-capacity assembled battery has a size larger than that of the high-power assembled battery.

7. The vehicle according to claim 1, wherein the high-power assembled battery has a plurality of cells connected in series, and
   the high-capacity assembled battery has a plurality of cells connected in parallel.

8. The vehicle according to claim 7, wherein the cell of the high-power assembled battery is a square-type cell, and
   the cell of the high-capacity assembled battery is a cylinder-type cell.

* * * * *